US008324558B2

(12) United States Patent
Brossi et al.

(10) Patent No.: US 8,324,558 B2
(45) Date of Patent: Dec. 4, 2012

(54) DEVICE AND METHOD FOR COUNTING AND DETECTING FLAT PRODUCTS

(75) Inventors: Steven Brossi, Bauma (CH); Carl Conrad Maeder, Hittnau (CH)

(73) Assignee: Ferag AG, Hinwil (CH)

( * ) Notice: Subject to any disclaimer, the term of this patent is extended or adjusted under 35 U.S.C. 154(b) by 397 days.

(21) Appl. No.: 12/594,168

(22) PCT Filed: Mar. 5, 2008

(86) PCT No.: PCT/CH2008/000087

§ 371 (c)(1), (2), (4) Date: Oct. 16, 2009

(87) PCT Pub. No.: WO2008/119192

PCT Pub. Date: Oct. 9, 2008

(65) Prior Publication Data

US 2010/0116975 A1 May 13, 2010

(30) Foreign Application Priority Data

Apr. 3, 2007 (CH) ...................................... 0539/07

(51) Int. Cl.
*B07C 5/12* (2006.01)
*G01N 21/88* (2006.01)

(52) U.S. Cl. .............................. 250/223 R; 250/559.47

(58) Field of Classification Search ............. 250/559.47, 250/223 R, 222.1, 308.1, 359.1, 370.09, 370.14; 378/54–56, 61; 342/156, 460
See application file for complete search history.

(56) References Cited

U.S. PATENT DOCUMENTS

| | | | | |
|---|---|---|---|---|
| 2,908,825 | A | 10/1959 | Frankle et al. | |
| 4,384,195 | A | 5/1983 | Nosler | |
| 5,221,837 | A | 6/1993 | Walgren et al. | |
| 5,280,171 | A * | 1/1994 | Halter | 250/223 R |

FOREIGN PATENT DOCUMENTS

| | | |
|---|---|---|
| DE | 3709965 | 10/1987 |
| EP | 0041489 | 12/1981 |
| EP | 0626663 | 11/1994 |
| EP | 1134594 | 9/2001 |
| JP | 59 077584 | 5/1984 |
| WO | WO 03/093154 | 11/2003 |
| WO | WO 2006/016186 | 2/2006 |
| WO | WO 2007/012206 | 2/2007 |

OTHER PUBLICATIONS

International Preliminary Report on Patentability dated Nov. 10, 2009, English Translation, PCT patent application No. PCT/CH2008/000087.

International Search Report dated Jun. 23, 2008, for PCT/CH2008/000087.

* cited by examiner

*Primary Examiner* — Georgia Y Epps
*Assistant Examiner* — Don Williams
(74) *Attorney, Agent, or Firm* — Alston & Bird LLP

(57) ABSTRACT

The device (10) according to the invention for counting and detecting flat products (14) comprises a light source (16) having an illumination beam profile (24), an optical sensor (18) having a detection beam profile (30) and an evaluation unit (20) connected to the optical sensor (18). The detection beam profile (30) overlaps the illumination beam profile (24) in a detection region in which a section (33) of a surface profile of the flat products (14) is illuminated, the section being at least partially delimited by the illumination beam profile (24). A detection signal generated by the optical sensor (18) is fed to the evaluation unit (20), which determines therefrom the number of flat products located in the detection region.

23 Claims, 1 Drawing Sheet

DEVICE AND METHOD FOR COUNTING AND DETECTING FLAT PRODUCTS

Figure 1:
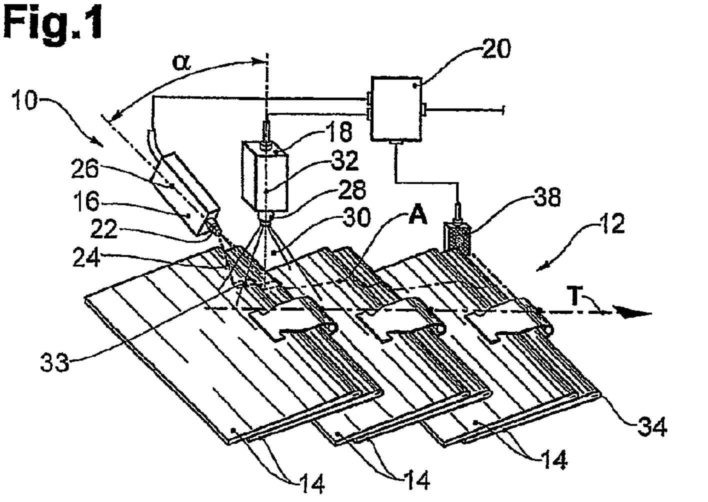

The present invention relates to a device for counting and detecting flat products in accordance with the preamble of claim 1, and to a method for counting and detecting flat products as claimed in claim 9.

Devices for counting flat products (also termed counting devices, for short) are generally known technical aids for determining the number of flat products. Appropriate error correction processes can be triggered given the establishment of a deviation between an expected number of flat products and the number determined by the counting device. Optical sensors are often used in counting devices in order to detect the number of flat products without contact and quickly.

Counting devices are disclosed, for example, in EP-A-1 661 833 and WO 2007/012206. In the case of a device described in the last mentioned document, flat products transported in clamps are provided with identification information which is subjected to optoelectronic monitoring during the movement of the flat product past a monitoring point. In the process, images of the identification information are recorded by means of an image recording unit. The recorded images are processed electronically and control signals for downstream processing devices are generated as a result of this processing.

In the case of the known device, the flat products must additionally be provided with identification information that is then to be detected in an image recording process often dependent on the ambient illumination. It is impossible in this way, or possible only with relatively large outlay, to count products bearing completely against one another in a flat fashion.

It is an object of the present invention to provide a counting device and a method for counting flat products, which device and/or which method permit the number of flat products to be determined with certainty and reliably and with the lowest possible outlay.

This object is achieved by a device for counting and detecting flat products as claimed in claim 1, and by a method for counting and detecting flat products as claimed in claim 9. Particularly preferred embodiments are provided with the features set forth in the dependent claims.

The inventive device for counting and detecting flat products, in particular printed products, has a light source, an optical sensor and an evaluation unit connected to the optical sensor. The light source, a laser in a preferred embodiment, has a beam shaping optics, for example in the form of optical lenses, in particular of cylindrical lenses, of diaphragms or diffractive optical elements by means of which a predetermined illumination beam profile is "impressed" on the emitted light. Objects located inside the illumination beam profile are irradiated with light. Via the beam shaping optics, the light source can be assigned an optical axis that extends rectilinearly in space starting from the light source. In the meaning of this application, this optical axis simultaneously forms a central beam axis of the illumination beam profile and is also denoted below as illumination beam axis.

The optical sensor, for example in a preferred embodiment an electronic camera with a plurality of photosensitive elements, is equipped with a detection optics for forming a detection beam profile. A camera objective, for example, is used as detection optics. The detection beam profile comprises all the locations from which the optical sensor can detect light. When use is made of an optical sensor with a plurality of photosensitive elements, as in the case of the camera already mentioned, the detection beam profile of the optical sensor is composed of the individual detection beam profiles assigned to each individual photosensitive element. The detection beam profile of the optical sensor could, for example, be rendered visible by replacing the photosensitive elements by small light sources. By analogy with the light source, it is also possible to assign an optical axis to the optical sensor via the detection optics. In the meaning of this application, this optical axis simultaneously forms a central beam axis of the detection beam profile and is also denoted below as detection beam axis.

According to the invention, the illumination beam profile and the detection beam profile are aligned angularly offset from one another in such a way that they overlap in a detection region. In a preferred embodiment, the illumination beam axis and the detection beam axis even lie in a plane. In order to count the flat products, at least one section of the surface profile of the flat products must be located in the detection region. According to the invention, this section is at least partially delimited by the illumination beam profile and can be detected by means of the optical sensor. The optical sensor can generate a detection signal with information relating to the detected section of the surface profile. The detection signal is passed on to a downstream evaluation unit. The evaluation unit, preferably a computer, can determine from the detection signal the number of the flat products that were located in the detection region at the instant of the detection.

In a particularly preferred embodiment, the device for counting and detecting flat products is assigned a transport device. The flat products moved through the detection region along a transport direction with the aid of the transport device are preferably counted continuously in order, for example, to monitor their completeness. In this case, the illumination beam axis is preferably aligned in a fashion inclined to the surface normal of the, for example, flat products resting on a conveyor belt or transported by means of clamps or grippers. By means of the beam shaping optics, the illumination beam profile in the detection region is preferably formed as a substantially rectilinear region, in particular as a so-called illumination line, which illuminates the section of the surface profile of the flat products in a defined way. The illumination line preferably extends in a fashion substantially parallel to the transport direction. Located directly above the flat products, with its detection beam axis slightly inclined to the surface normal thereof, and in a fashion substantially at right angles to the transport direction, is a camera serving as optical sensor. The detection beam profile is formed by the detection optics in such a way that an image of the illumination line projected by the light source onto the surface of the flat products is produced on the photosensitive elements of the camera.

Particularly whenever an edge region of a flat product is located in the detection region, because of the differences in height in the surface profile "to be scanned" that are caused by the thickness and the arrangement of the flat products, an image, recorded by the camera, of the illumination line projected onto this uneven "projection surface" will reproduce the curves and offsets thereof. This image information is passed on in the detection signal to an electrically connected computer. An image processing program that can be executed on the computer can then determine the number of the flat products that were located in the detection region from the image of the projected illumination line with the aid of the curve and offsets. In order for the image information to be influenced as little as possible by movement artifacts owing to the transport of the flat products during the image recording, the recording and/or detection time is short by comparison with the time within which a flat product has moved by the amount of its thickness.

The number of the flat products located in the detection region is determined solely from the detected surface profile of the flat products. It is not necessary to apply identification information to the flat products. An adequate contrast in image recordings results from the fact that the light in the illumination beam profile, particularly inside the illumination line in the detection region, has been produced with a comparatively high intensity by the light source as compared with the ambient light, and so a reliable identification of the irradiated surface profile is ensured. Given the use of a substantially monochromatic light source, for example a laser, the optical sensor can, moreover, be equipped with appropriate filter elements in order additionally to reduce the interference from ambient light.

Figure 2:
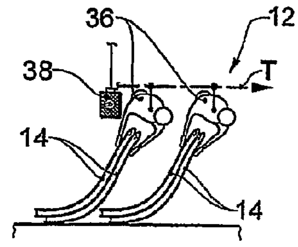
Figure 3:
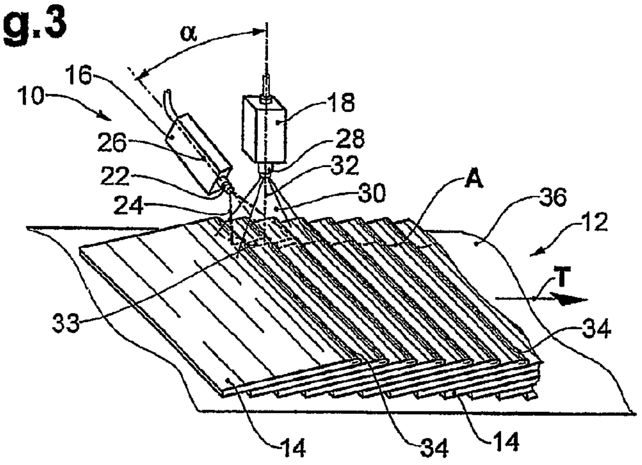
Figure 4:
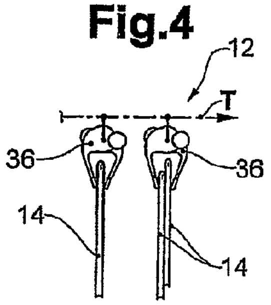

Particularly preferred embodiments of the present invention are described in detail below with the aid of schematics. In detail:

FIG. 1 shows a perspective illustration of a preferred embodiment of the inventive device for counting and detecting flat products having an assigned transport device transporting the flat products by means of clamps, a laser light source arranged to the side of the flat products projecting an illumination line onto the surface of the flat products transported through a detection region, and a camera located above the flat products detecting the surface profile illuminated thereby;

FIG. 2 shows a side view of a section of a further design of an assigned transport device, in the case of which in each case two flat products are transported, held in each case by a gripper, along a transport direction, and a further sensor of the device for counting and detecting flat products detects the grippers moved past in order to be able to assign a previously determined number of flat products to a specific gripper by means of a trigger signal generated by the further sensor;

FIG. 3 shows a perspective illustration of a section of the device shown in FIG. 1, the transported flat products now being transported through the detection region in an imbricated arrangement in a fashion resting on a conveyor belt;

FIG. 4 shows a side view of a section of a further embodiment of an assigned transport device with flat products held on grippers individually or in pairwise fashion; and FIGS. 5*a*-5*e* show abstracted image recordings of flat products transported through the detection region in a fashion suspended on grippers, surface profiles irradiated by the illumination line respectively being drawn by dashes, and the respectively schematic side views of the flat products being illustrated as well, purely by way of alternative.

A particularly preferred embodiment of the inventive device for counting and detecting flat products (also called counting device below, for short) 10 is illustrated schematically in FIG. 1 with a transport device 12 assigned to it. The counting device 10 for flat products 14, in particular printed products, such as newspapers, magazines, brochures, etc., transported by means of the transport device 12, has a light source 16, an optical sensor 18 and an evaluation unit 20 connected to the optical sensor 18.

Use can preferably be made as light source 16 of lasers, in particular laser diodes or gas lasers, LEDs, but also of classic radiation sources such as incandescent or halogen lamps. The light source 16 is equipped with a beam shaping optics 22 that provides a predetermined illumination beam profile 24 and defines an optical axis of the light source 16.

In the case of the embodiment shown in FIG. 1, the illumination beam profile 24 of the light source 16 arranged to the side of a transport direction T, along which the flat products 14 are being transported, has a cross section (also beam cross section) formed substantially in a fashion delimited at least partially rectilinearly, substantially linearly, preferably substantially rectilinearly. The beam cross section is measured here at right angles to the optical axis of the light source 16, also called the illumination beam axis 26 below. The linear, preferably rectilinear beam cross section is also denoted as the illumination line. The illumination beam profile 24 with its linear beam cross section extends in this case substantially in a plane.

Elongated, substantially linear beam cross sections can be produced with the aid of known beam shaping optics 22 that are, for example, equipped with cylindrical lenses, diaphragms or diffractive elements. The illumination beam profile 24 preferably has a higher light intensity than the ambient light, at least in a detection region defined below. In addition, the light source 16 provides preferably substantially monochromatic light such as is produced, for example, by lasers, monochromatic LEDs or classic light sources equipped with a filter. It is possible in this way for the light produced by the light source 16, scattered on the flat products 14 and detected by the optical sensor 18 to be distinguished from ambient light on the basis both of its intensity and of its spectral region, and thus to ensure a reliable detection and counting of the flat products 14.

In the case of the described embodiments of the inventive counting device 10, use is made as optical sensor 18 of an electronic camera with a plurality of photosensitive elements, for example a CCD camera. The optical sensor 18 is equipped with a detection optics 28 in the form of a camera objective, which detection optics provide a detection beam profile 30 and define an optical axis of the optical sensor 18. The optical axis of the optical sensor 18 is denoted below as detection beam axis 32. The optical sensor 18 is arranged above the flat products 14 such that an image of the illumination line projected onto the flat products 14 is produced by means of the detection optics 28 on the photosensitive elements of the optical sensor 18. That is to say, the illumination beam profile 24 of the light source 16, and the detection beam profile 30 of the optical sensor 18 are aligned with one another with an angular offset such that they overlap in a detection region in which at least one section 33 of a surface profile of the flat products 14 is located for counting. The section 33, located in the detection region and illuminated thereby, of the surface profile is at least partially delimited by the predetermined illumination beam profile 24.

A scattering angle $\alpha$ that is enclosed by the illumination beam axis 26 and the detection beam axis 32, is preferably between 10° and less than 180°, with particular preference between 30° and 45°. As shown in the case of the arrangement in FIG. 1 and FIG. 3, to this end the light source 16 can be arranged to the side with reference to the flat products 14 in such a way that the longitudinal axis of the illumination line is aligned substantially parallel to the transport direction T. In the case of the detection operation for counting the flat products 14, the illumination line preferably extends over an edge region of the flat products 14, preferably, in the case of folded flat products 14, over the fold 34 thereof.

The optical sensor 18 can be arranged both above and to the side of the flat products 14. The positions shown for the light source 16 and optical sensor 18 can also be interchanged. In the case of an arrangement above the flat products 14, the detection beam axis 32 or the illumination beam axis 26 is preferably aligned in a fashion inclined to the surface normals of the flat products 14, and at right angles to the transport direction T.

The basic principle of the counting device 10 consists in the fact that the substantially rectilinear illumination line, whose form is known, is projected onto a section 33, which is uneven owing to the thickness and/or arrangement of the flat products 14, of the surface profile of the flat products 14, and in the case of an angularly offset detection the changes in height of the surface profile of the flat products can be established as curves and offsets in the image of the illumination line as acquired by the optical sensor 18.

The illuminated section 33, detected by the optical sensor 18, of the surface profile of the flat products 14 is present as recorded image in the case of the embodiment under consideration, where a camera is used as optical sensor 18. The image information is passed on to the evaluation unit 20, for example a computer, via an electric connection by means of a detection signal.

Use is made in the evaluation unit 20 of a suitable computer program, in particular an image processing program, in order to extract from the detection signal the relevant information relating to the detected section 33 of the surface profile, and to assign curves, edges and offsets that have been found to a specific number of flat products 14. In extracting the relevant information relating to the surface profile, known discrimination methods can be used to filter out interfering additional information still present in the images, for example characters and images, visible owing to the ambient light, on the surface of the flat products 14.

A surface profile scanned by means of the inventive counting device is illustrated in FIGS. 1 and 3 by dashed lines that are provided with the reference symbol A. The flat products 14 are transported in FIG. 1 with the aid of transport means 36, belonging to the counting device 10, in the form of clamps. Here, one transport means 36 each respectively holds two flat products 14 in such a way that a flat product 14 leading in the transport direction T reaches further into a clamp mouth of the transport means 36 than does a trailing further flat product 14 resting partially on the leading flat product 14.

As likewise shown in FIG. 1, the respective transport means 36 themselves also can be detected by a further sensor 38, for example in the form of a light barrier. During the passage of a transport means 36 through a monitoring region of the further sensor 38, the further sensor 38 generates a trigger signal and passes it on to the evaluation unit 20. The number of flat products 14 detected at a specific instant can now respectively be assigned to a specific transport means 36 by taking account of the transport speed of the transport means 36. Through a comparison with a prescribed desired number of flat products that should be held by a transport means 36, it can now be established whether faults have occurred in the loading of the transport means 36 or in the transport so that, for example, an appropriate control signal can be triggered at a downstream processing device.

The further sensor 38 used for the assignment is likewise shown in FIG. 2. As seen in the transport direction T, it can be arranged both ahead of the counting device 10 and behind the counting device 10. In the embodiment of the transport device 12 shown in FIG. 2, two flat products 14 are each held by transport means 36 designed as grippers in a fashion lying completely over one another.

A further embodiment of a transport device 12 with a conveyor belt as transport means 36 is illustrated in FIG. 3. The flat products 14 are transported through the detection region of the counting device 10 with their fold 34 leading in the transport direction T in an imbricated formation resting on the transport means 36. As already previously mentioned, in this illustration the surface profile A of the flat products 14 that is scanned by the counting device 10 is illustrated by a dashed line.

The inventive counting device 10 can also be used to count individual flat products 14 or ones partially overlapping one another, which, as shown in FIG. 4, are transported in a fashion suspended from transport means 36 designed as grippers.

It proved possible for the abstracted image recordings shown in FIGS. 5*a* to 5*e* to be recorded in the case of an arrangement of the optical sensor 18 in such a way that its detection beam axis 32 is aligned substantially along the longitudinal axis of the fold 34 of the flat products 14. Here, the illumination beam axis 26 of the light source 16 is directed from above onto the free end region of the fold 34 on the camera side, and advantageously runs at least virtually parallel to the product sides 40 of the flat products 14. The illumination beam axis 26 and the detection beam axis 32 also define here a plane that extends substantially at right angles to the transport direction T.

Figure 5A:
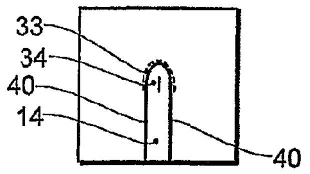
Figure 5B:
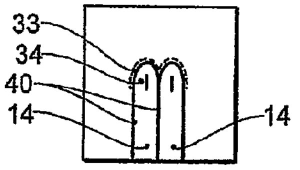
Figure 5C:
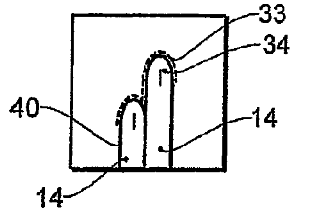
Figure 5D:
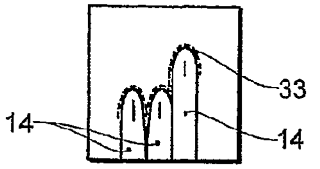

For the purpose of explanation, in addition to the sections 33, illuminated by the illumination line, of the surface profiles that are illustrated as dashed lines, FIGS. 5*a* to 5*e* also illustrate the side views of the respectively scanned flat products 14 in the abstracted image recordings. It is shown with the aid of these exemplary abstracted image recordings that flat products 14 transported in a suspended fashion by means of grippers or clamps can be transported and counted individually (FIG. 5*a*), in pairwise fashion (FIGS. 5*b*, 5*c* and 5*e*) or else in a multiple arrangement, for example three at a time (FIG. 5*d*).

Figure 5E:
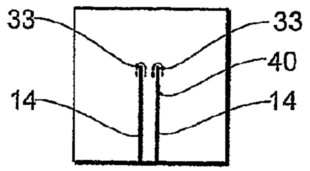

As shown in FIGS. 5*b* and 5*e*, it is possible in this case to detect and count both when flat products 14 are arranged offset from one another (FIG. 5*c* and FIG. 5*d*), and when flat products 14 bear completely against one another. This holds true both for multi-page, folded flat products 14, as shown in FIGS. 5*a* to 5*d*, and for single-layer, unfolded flat products 14, as illustrated in FIG. 5*e*. In order to increase the reliability of the counting in the case of a plurality of single-layer, unfolded flat products 14 held jointly in a clamp or a gripper, said products can, for example, be at least partially spread apart by blowing in air, and thus be spaced apart from one another.

In the case of continuous counting of flat products 14 transported continuously through the detection region by means of the assigned transport device 12, it is preferred in the interests of the optical quality of the image recordings and thus of the reliability of the counting that the camera functioning as optical sensor 18 record image recordings within a time that be shorter, preferably very much shorter, than the time within which a flat product 14 moves in the detection region by the amount of its thickness.

Furthermore, the reliability of the counting can be increased when, as already mentioned previously, the light intensity of the light source 16 is enlarged by comparison with the ambient light, or a filter that is tuned to the wavelength of the light emitted by the light source 16 is used in the optical sensor 18. In addition, by enlarging the angle $\alpha$ between the illumination beam axis 26 and the detection beam axis 32 it is possible to enlarge the curves, edges and offsets in the images of the illuminated surface sections 33.

The inventive counting device 10 and the inventive method for counting flat products 14 enable flat products 14 to be counted in a way that can be implemented with a moderate outlay on apparatus, is reliable and suitable for the most varied transport formations of flat products 14. The flat products 14 can be transported during the detection and counting, the absolute value of the transport speed being bounded by the shortest possible recording time of the optical sensor 18 during which counting can be conducted reliably despite movement artifacts resulting in the image recordings from the transport.

Otherwise, both the illumination beam profile 24 and the detection beam profile 30 can be adapted to the specific requirements. Thus, it is possible for a plurality of illumination lines, or else temporarily varying patterns of illumination lines, to be projected onto the surface of the flat products 14 and be detected by means of the optical sensor 18. It is important here that the surface section 33, located in the detection region, of the flat products 14 be bounded at least partially by the predetermined illumination beam profile 24.

In addition to the counting of flat products 14 and, therefore, the determination of defective numbers, it is also possible to detect deformed and/or incomplete products 14 with the aid of the image, detected by the optical sensor 18, of the illumination line. By comparison with expected changes in height in the surface profile, these products 14 have deviations from which it is possible to draw conclusions concerning a deformation and/or incompleteness. To this end, comparative operations between detected and expected signals are, for example, executed in the evaluation unit 20. In the case when the deviations lie outside prescribed tolerance ranges, the evaluation unit 20 generates signals that trigger predetermined error processing procedures. In particular, a signal for ejecting deformed and/or incomplete products 14 can be passed on to a processing device downstream of the counting device 10 in the transport direction T. Of course, it is also possible in this way to detect products 14 of various types, for example on the basis of their different thickness, and subsequently to sort them, for example by separating the product stream.

The invention claimed is:

1. A device for counting and detecting flat products comprising:

a light source, an optical sensor with a detection optics for forming a detection beam profile, an evaluation unit connected to the optical sensor, wherein the light source is equipped with a beam shaping optics for forming an illumination beam profile that overlaps the detection beam profile of the optical sensor in a detection region, a section of a surface profile of the flat products that is located in the detection region and is delimited at least partially by the illumination beam profile can be detected by means of the optical sensor from an angularly offset alignment of the illumination beam profile as against the detection beam profile, and it being possible to determine the number of the flat products in the detection region by means of the evaluation unit from a detection signal that is generated by the optical sensor and includes information relating to the detected section of the surface profile.

2. The device as claimed in claim 1, characterized in that the cross section of the illumination beam profile in the detection region, measured at right angles to the optical axis of the light source, is formed substantially in a fashion delimited at least partially rectilinearly with the formation of an illumination line.

3. The device as claimed in claim 1, characterized in that the optical axes of the light source and of the optical sensor enclose an angle of between approximately 10° and less than 180°.

4. The device as claimed in claim 1, characterized in that the optical axes of the light source or of the optical sensor are aligned in a fashion inclined to the surface normal of the flat products.

5. The device as claimed in claim 1, characterized by an assigned transport device wherein the flat products are transported along a transport direction, the optical axis of the optical sensor being oriented substantially at right angles to the transport direction, and the longitudinal axis of a cross section of the illumination beam profile in the detection region running substantially parallel to the transport direction.

6. The device as claimed in claim 5, characterized by a further sensor that generates a trigger signal in the event of a passage of a transport mechanism of the transport device through a monitoring region of the further sensor such that the number of flat products determined in relation to a specific instant can be assigned to the respective transport mechanism.

7. The device as claimed in claim 1, characterized in that the optical sensor is a camera that detects image recordings within a recording time that is shorter than the time within which a flat product moves by the amount of its thickness in the detection region.

8. The device as claimed in claim 1, characterized in that the light intensity in the illumination beam profile of the light source in the detection region is greater than the light intensity of the ambient light.

9. A method for counting and detecting flat products with the use of a device for counting and detecting flat products as claimed in claim 1, wherein a section of a surface profile of the flat products that is located in the detection region and is delimited at least partially by the illumination beam profile is detected by means of the optical sensor from an angularly offset alignment of the illumination beam profile as against the detection beam profile, and wherein the number of the flat products in the detection region is determined by the evaluation unit connected to the optical sensor from a detection signal that is generated by the optical sensor and includes information relating to the detected section of the surface profile.

10. The method as claimed in claim 9, characterized in that during the detection an edge region of one of the flat products is located in the detection region.

11. The method as claimed in claim 9, characterized in that with the aid of transport mechanism of a transport device assigned to the device the flat products are individually transported relative to the device into the detection region along a transport direction in an imbricated formation in which they overlap one another partially or bear completely against one another.

12. The method as claimed in claim 11, characterized in that a trigger signal is generated during a passage of one of the transport mechanism through a monitoring region of a further sensor such that the number of flat products determined in relation to a specific instant can be assigned to exactly one transport mechanism.

13. The method as claimed in claim 9, characterized in that the number of the flat products is determined from recordings, which have been recorded by the optical sensor, by an image processing program that is executed in the evaluation unit.

14. The method as claimed in claim 9, characterized in that with the aid of clamps, grippers or a conveyor belt, the flat products are individually transported relative to the device into the detection region along a transport direction in an imbricated formation in which they overlap one another partially or bear completely against one another.

15. The device as claimed in claim 1, characterized in that the cross section of the illumination beam profile in the detection region, measured at right angles to the optical axis of the light source, is formed substantially in a fashion delimited substantially linearly with the formation of an illumination line.

16. The device as claimed in claim 1, characterized in that the optical axes of the light source and of the optical sensor enclose an angle of between approximately 30° and 45°.

17. The device as claimed in claim 1, characterized in that the optical sensor is an electronic camera that detects image recordings within a recording time that is shorter than the time within which a flat product moves by the amount of its thickness in the detection region.

18. The device as claimed in claim 1, characterized in that the optical sensor is a CCD or CMOS camera that detects image recordings within a recording time that is shorter than the time within which a flat product moves by the amount of its thickness in the detection region.

19. The device as claimed in claim 1, characterized in that the light intensity in the illumination beam profile of the light source in the detection region is greater than the light intensity of the ambient light, and in that the light source provides substantially monochromatic light.

20. The device as claimed in claim 19, wherein the light source is a laser.

21. A device for detecting flat products comprising:

a light source, an optical sensor with a detection optics for forming a detection beam profile, and an evaluation unit connected to the optical sensor, wherein the light source is equipped with a beam shaping optics for forming an illumination beam profile that overlaps the detection beam profile of the optical sensor in a detection region, a section of a surface profile of the flat products that is located in the detection region and is delimited at least partially by the illumination beam profile can be detected by the optical sensor from an angularly offset alignment of the illumination beam profile as against the detection beam profile, and it being possible to detect deformed flat products, which in comparison to expected changes in height in the surface profile have deviations, in the detection region by the evaluation unit from a detection signal that is generated by the optical sensor and includes information relating to the detected section of the surface profile by executing comparative operations between detected and expected signals in the evaluation unit.

22. A device for detecting flat products comprising:

a light source, an optical sensor with a detection optics for forming a detection beam profile, and an evaluation unit connected to the optical sensor, wherein the light source is equipped with a beam shaping optics for forming an illumination beam profile that overlaps the detection beam profile of the optical sensor in a detection region, a section of a surface profile of the flat products that is located in the detection region and is delimited at least partially by the illumination beam profile can be detected by the optical sensor from an angularly offset alignment of the illumination beam profile as against the detection beam profile, and it being possible to detect incomplete flat products, which in comparison to expected changes in height in the surface profile have deviations, in the detection region by means of the evaluation unit from a detection signal that is generated by the optical sensor and includes information relating to the detected section of the surface profile by executing comparative operations between detected and expected signals in the evaluation unit.

23. A device for detecting flat products comprising:

a light source, an optical sensor with a detection optics for forming a detection beam profile, and an evaluation unit connected to the optical sensor, wherein the light source is equipped with a beam shaping optics for forming an illumination beam profile that overlaps the detection beam profile of the optical sensor in a detection region, a section of a surface profile of the flat products that is located in the detection region and is delimited at least partially by the illumination beam profile can be detected by the optical sensor from an angularly offset alignment of the illumination beam profile as against the detection beam profile, and it being possible to detect flat products of various types, which in comparison to expected changes in height in the surface profile have deviations, in the detection region by means of the evaluation unit from a detection signal that is generated by the optical sensor and includes information relating to the detected section of the surface profile, by executing comparative operations between detected and expected signals in the evaluation unit.

* * * * *